United States Patent [19]
Nedstedt

[11] Patent Number: 5,778,124
[45] Date of Patent: Jul. 7, 1998

[54] DEVICE FOR OPTICAL CONNECTION OF AN OPTICAL ELEMENT, FOR EXAMPLE AN OPTICAL FIBRE, WITH A LENS

[75] Inventor: Bo Nedstedt, Parkgatan, Sweden

[73] Assignee: Formex AB, Anderstorp, Sweden

[21] Appl. No.: 963,881

[22] Filed: Nov. 4, 1997

Related U.S. Application Data

[63] Continuation of Ser. No. 614,531, Mar. 13, 1996, abandoned.

[30] Foreign Application Priority Data

Aug. 18, 1995 [SE] Sweden ................... 9502888

[51] Int. Cl.⁶ ............................ G02B 6/32
[52] U.S. Cl. .............. 385/79; 359/819; 385/35; 385/61; 385/93
[58] Field of Search .............. 385/35, 61, 79, 385/93; 359/819

[56] References Cited

U.S. PATENT DOCUMENTS

| | | | |
|---|---|---|---|
| 3,904,277 | 9/1975 | Phillips et al. | 359/819 X |
| 4,781,431 | 11/1988 | Wesson et al. | 385/79 |
| 4,889,399 | 12/1989 | Mariani et al. | 385/35 |
| 4,988,375 | 1/1991 | Bornhauser | 385/35 X |
| 5,107,537 | 4/1992 | Schriks et al. | 385/93 X |
| 5,247,595 | 9/1993 | Földi | 385/35 X |
| 5,459,805 | 10/1995 | Foster | 385/35 X |

FOREIGN PATENT DOCUMENTS

| | | | |
|---|---|---|---|
| 9101877 | 8/1991 | Sweden. | |
| 2054896 | 2/1981 | United Kingdom | 385/35 |
| 2221324 | 1/1990 | United Kingdom | 385/35 |

*Primary Examiner*—John D. Lee
*Attorney, Agent, or Firm*—Baker & Daniels

[57] ABSTRACT

A device for optical connection of an optical element, for example an end portion of an optical fiber (2), with a spherical lens (4) comprises a connector element (14). The connector element has a surface for defining the position of the spherical lens and a surface for defining the position of the optical element in relation thereto. A surface of the connector element for defining the position of the spherical lens (4) are constituted by a circular edge surface (18) formed with a radius.

20 Claims, 6 Drawing Sheets

DEVICE FOR OPTICAL CONNECTION OF AN OPTICAL ELEMENT, FOR EXAMPLE AN OPTICAL FIBRE, WITH A LENS

This is a continuation of application Ser. No. 08/614,531, filed Mar. 13, 1996 (abandoned).

The present invention relates to a device for optical connection of an optical element, for example an end portion of an optical fibre, with a spherical lens.

In fibre optical systems there are different points at which optical connections between the different optical elements included in the system. Thus, there are required optical connections between different lengths of optical fibres, between an optical fibre and a light source, for example a diode, between an optical fibre and a light detector etc. Each connection must be established while using very great accuracy if the losses shall be kept at a minimum. Of course, the problem of providing a correct connection is emphazised by the fact that optical fibres have a very small cross sectional area and that also small deviations from a correct position between two fibre end portions which shall be connected with each other cause substantial losses. It is important especially to avoid angular deviations between the fibres, i.e. it is important that the fibres which are connected with each other are positioned on the same optical axis.

Different devices for providing a correct connection of optical fibres with each other and with other optical elements have been suggested. Such previously known devices comprise lens systems in which the light beam is magnified so that the light transmission in the connection takes place at a sectional area which is magnified several times providing for a corresponding reduction of the sensitivity to deviations from the correct position. Thereby, it is a drawback that the connection of two fibre end portions to each other requires instead of one single connection, i.e. the connection between the fibre end portions, an optical connection of the fibre end portions to one lens each and an optical connection of the lenses to each other, i.e. three connections. Thereby, it is important that the optical fibres and the lenses are positioned on the same optical axis as well as that the end surfaces of the fibres are positioned in the focus of the lens in question. Thus, the connections between the optical fibres and the lenses constitute the most sensitive parts of the connection system while the optical connection of the lenses to each other can easily be provided without errors.

Different devices for connecting an optical element with a lens are previously known. A drawback of previously known connection devices is the fact the they are either complicated in respect of their construction or offer insufficient accuracy with regard to the requirement that the optical element and the lens shall be positioned on the same optical axis and that the optical element shall be positioned in the focus of the lens. A previously known device for optical connection of an optical element, for example an end portion of an optical fibre, with a spherical lens comprises a connector element having one surface for determining the position of the spherical lens and one surface for determining the position of the optical element in relation to the spherical lens and thereby for determining the relative position between the optical element and the spherical lens. In prior art devices of this kind it is a drawback that the surface for determining the position of the spherical lens is either of such a design that the position of the lens is not determined with sufficient accuracy or is of such a design that the surface of the lens is subjected to too large stresses.

The object of the invention is to provide a device for optical connection of an optical element, for example an end portion of an optical fibre, with a spherical lens in which the surface of the connector element for defining the position of the spherical lens is of such a design that the above drawbacks of the prior art devices are obviated.

In order to comply with this object the device according to the invention is characterized in that the surface of the connector element for defining the position of the spherical lens is constituted by a circular edge surface formed with a radius, i.e., the edge defining the circular opening has a cross sectional profile which defines an arc whereby the circular edge surface forms a rounded edge.

A surface of this kind provides that the spherical lens is connected with the optical element, for example the end portion of an optical fibre, in such a way that the optical element and the lens are positioned on the same optical axis and that the lens takes a correct position in relation to the optical element with regard to the relationshiop between the optical element and the focus of the lens.

It is suitable that the radius of the circular edge surface is about 0.25 mm.

In a preferred embodiment of the device according to the invention the device comprises a fixing element for fixing the spherical lens in a position in which the spherical lens contacts the circular edge surface of the connector element, formed with a radius, the fixing element suitably comprising a locking element engaging the connector element, the locking element consisting of a rigid material, and an elastic material element positioned between the locking element and the spherical lens.

It is suitable that the device according to the invention comprises a retainer for fixing the optical element in a predetermined position in relation to reference surfaces of the retainer and that the surfaces of the connector element for defining the position of the optical element in relation to the spherical lens engage the reference surfaces of the retainer. Thereby, the surface of the connector element engaging the reference surface of the retainer can be constituted by a conical surface tapering in the direction of the spherical lens. The reference surface of the retainer and the surface of the connector element engaging the reference surface of the retainer can as an alternative be constituted by cooperating cylindrical surfaces and by engagement surfaces extending transversely in relation to the axes of the cylindrical surfaces.

The device according to the invention can be used in connection with different combinations of optical elements and a spherical lens, for example for transmitting a light beam from a diode to an optical fibre through two spherical lenses. Thereby there are used two devices according to the invention, one device for connecting the diode to the spherical lens and one device for connecting the optical fibre with another spherical lens. The correct relative position between the two connector elements for transmitting the light beam between the spherical lenses is in a known manner provided by means of guiding pins or other guiding surfaces arranged on the connector elements. It is realized that the relative position between the spherical lenses does not require any adjustment of such a great accuracy as the relative position between the lens and the optical element connected therewith.

The invention is described in the following with reference to the accompanying drawings.

Figure 1:
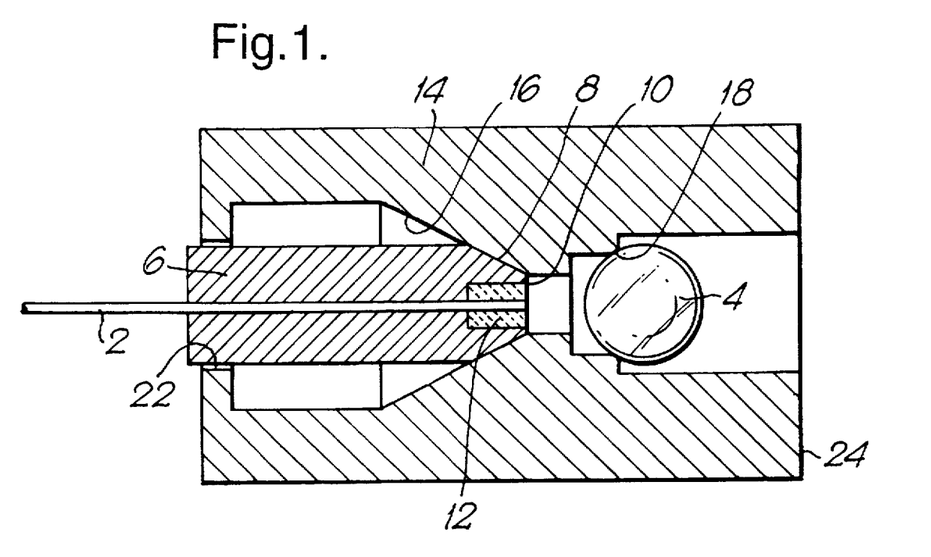
FIGS. 1, 2, 3, and 4 are schematic sections of different embodiments of devices according to the invention for optical connection of an optical element with a spherical lens.

The device according to the invention is adapted to be included in a system for connecting a first optical element, for example an optical fibre, with another optical element, for example another optical fibre, in which system the optical elements are connected with one lens each, so that the transmission of the light between the optical elements takes place through the lenses. The embodiment of a device according to the invention schematically shown in section in FIG. 1 is used for connecting an optical fibre 2 with a spherical lens 4. The end portion of the optical fibre 2 is enclosed in a fibre retainer 6 designed as a sleeve. The fibre retainer 6 is cylindrical along the main portion of its outer surface and has at its right end in the figure a conical reference surface 8 connecting with a flat end surface 10 of the fibre retainer 6. In the embodiment shown in FIG. 1 the main part of the fibre retainer 6 consists of metal while the flat end surface 10 is formed by an insert 12 of ceramic material moulded into the fibre retainer.

The optical fibre 2 is fixed in the fibre retainer in a known manner, for example by means of an adhesive, the end surface of the optical fibre 2 being positioned in the same plane as the flat end surface 10 of the insert 12. A correct position of the end surface of the optical fibre 2 can be provided by fixing the fibre with the end portion projecting somewhat outside the plan end surface 10, whereupon the fibre is ground to the plane of the end surface 10. The flat end surface 10 of the fibre retainer has an exactly predetermined position in relation to the conical reference surface 8 of the fibre retainer, and when the end surface of the fibre 2 is positioned in the plane of the end surface 10, the end surface of the fibre 2 will consequently be related to the conical reference surface 8 in a predetermined way.

The device for optical connection of the optical fibre 2 with the spherical lens 4 comprises in addition to the fibre retainer 6 a connector element 14. The connector element 14 is provided with surfaces for determining the relative position between the fibre retainer 6 and thereby the optical fibre 2 and the spherical lens 4. The surface of the connector element 14 for defining the position of the fibre retainer 6 and thereby the optical fibre 2 is constituted by a conical surface 16 tapering in the direction of the spherical lens 4. Thus, the conical surface 16 is adapted to engage the conical reference surface 8 of the fibre retainer 6 in order to exactly define the position of the fibre retainer 6 in the connector element 14. The surface for defining the position of the spherical lens in the connector element 14 and thereby for defining the relative position between the optical fibre 2 and the spherical lens 4 is constituted by a circular edge surface 18 formed with a radius. The circular edge surface is formed with a radius of about 0.25 mm and provides an extremely accurate definition of the position of the spherical lens without damaging the surface of the spherical lens by subjecting the surface to too large stresses.

The fibre retainer 6 and the spherical lens 4 are maintained in firm engagement with the conical surface 16 and the edge surface 18 formed with a radius, respectively, by means of arrangements not shown in detail in FIG. 1. In respect of the fibre retainer 6 these arrangements can be constituted by a conventional sleeve nut engaging a shoulder on the fibre retainer 6, not shown in the drawing, while said arrangement in respect of the spherical lens can be constituted by devices of the kind shown in FIGS. 7 and 8.

The conical surface 16 and the edge surface 18 formed with a radius are positioned in relation to each other so that the optical fibre 2 and the spherical lens 4 are positioned on the same optical axis and at such an axial distance from each other that the end surface of the optical fibre 2 is in the focus of the spherical lens 4, when the conical reference surface 8 and the spherical lens 4 engage the surface belonging thereto.

In order to make sure that the fibre retainer 6 is oriented so that the portion of the optical fibre received in the fibre retainer is over its total length positioned on the optical axis common with the optical axis of the spherical lens, the optical element 14 can be provided with support surfaces 22 adapted to engage the fibre retainer 6 at the end of the fibre retainer 6 opposite from the conical reference surface 8.

In a plane outside the spherical lens 4 the connector element 14 has a contact surface 24. The contact surface 24 is adapted to engage a corresponding surface of another connector element to be connected with the connector element 14 for providing an optical connection of the optical fibre 2 with another optical element, for example another optical fibre, a diode or a light sensor device, included in the other connector element. It is thereby important that the contact surface 24 is exactly perpendicular to the axis of the conical surface 16 and the edge surface 18, and this can be provided by manufacturing the surfaces 16 and 18 and the contact surface 24 in one and the same machine and in a continuous operation.

Figure 2:
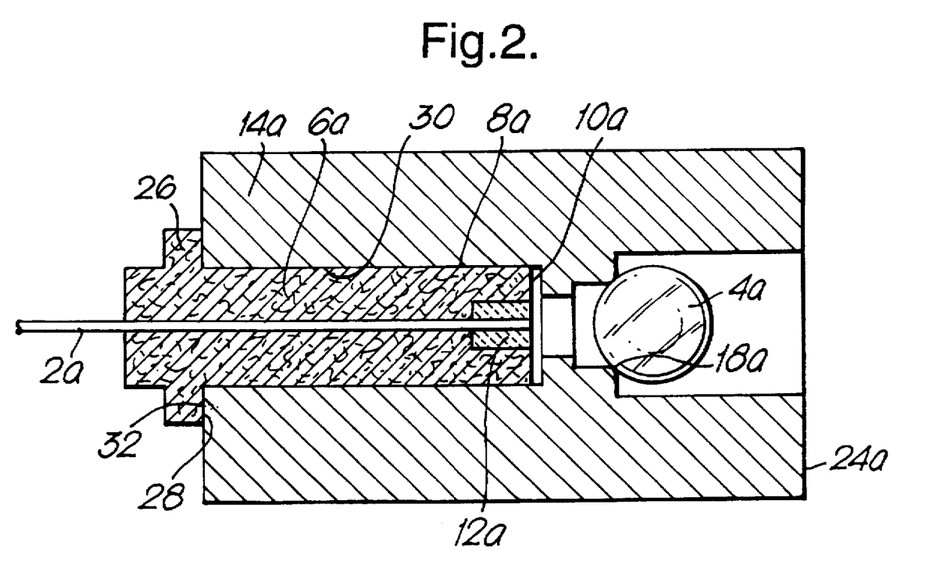

The embodiment of the device according to the invention shown in FIG. 2 is like the device according to FIG. 1 used for connecting an optical fibre 2a with a spherical lens 4a. The end portion of the optical fibre 2a is enclosed in a fibre retainer 6a in the form of a sleeve. The fibre retainer 6a has a cylindrical outer surface 8a connecting with a flat end surface 10a on the fibre retainer 6a. As is the case in the embodiment according to FIG. 1, the main portion of the fibre retainer 6a is constituted by metal while a part of the flat end surface 10a consists of an insert 12a of ceramic material moulded into the fibre retainer.

The optical fibre 2a can be fixed in the fibre retainer 6a according to the same principles as the optical fibre 2 is fixed in the fibre retainer 6 according to FIG. 1, and the correct position of the end surface of the optical fibre 2a can be provided in the same way as described with reference to FIG. 1.

At its outer surface the retainer 6a has an annular flange 26, having an annular side 28 which forms in relation to the cylindrical reference surface 8a a perpendicular reference surface 28 which takes an exactly predetermined position in relation to the flat end surface 10a of the fibre retainer and thereby in relation to the end surface of the fibre 2a. Thus, the end surface of the fibre 2a takes a predetermined position in relation to the cylindrical reference surface 8a as well as to the annular reference surface 28 extending transversely thereto.

As is the case in the embodiment according to FIG. 1 the device for optical connection of the optical fibre 2a with the spherical lens 4a in the device according to FIG. 2 includes in addition to the fibre retainer 6a a connector element 14a. Also in this embodiment the connector element 14a is provided with surfaces for defining the relative position between the fibre retainer 6a and the optical fibre 2a connected therewith and the spherical lens 4a. The surfaces of the connector element 4a for defining the relative position between the fibre retainer 6a and thereby the optical fibre 2a and the spherical lens 4a are constituted by a cylindrical surface 30 defining an opening for receiving the retainer 6a and an end surface 32 extending perpendicular to the cylindrical surface 30 and surrounding the opening for receiving the retainer 6a and a circular edge surface 18a formed with a radius, said edge surface defining the position of the spherical lens 4a in the connector element 14a. The cylindrical surface 30 and the circular edge surface 18a formed with a radius are positioned on the same axis.

The spherical lens 4a and the fibre retainer 6a are maintained in engagement with the edge surface 18a and the surfaces 30 and 32, respectively, by elements which are not shown in detail in FIG. 2. Like in the embodiment according to FIG. 1 these elements can be constituted by a conventional sleeve nut and devices of the kind shown in FIGS. 7 and 8. As in the embodiment according to FIG. 1 the optical fibre 2a and the spherical lens 4a are positioned on the same optical axis and at such a distance from each other that the end surface of the optical fibre 2a is positioned in the focus of the spherical lens 4a.

In a plane outside the spherical lens 4a the connector element 14a has a contact surface 24a having the same design and function as the contact surface 24 in the embodiment according to FIG. 1.

Figure 3:
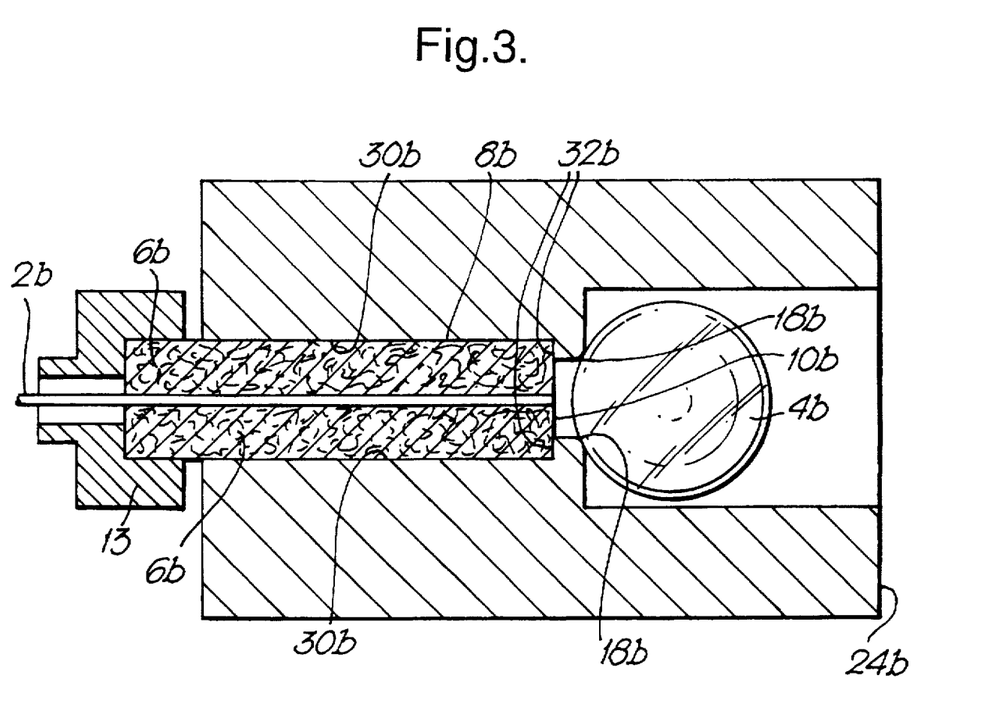

Also the embodiment of the device according to the invention shown in FIG. 3 is intended for connecting an optical fibre 2b with a spherical lens 4b. The end portion of the optical fibre 2b is also in this embodiment enclosed in a fibre retainer 6b in the form of a sleeve. The fibre retainer 6b has a cylindrical outer surface 8b which connects with a flat end surface 10b on the fibre retainer 6b. Unlike the embodiment according to FIGS. 1 and 2 the main part of the fibre retainer 6b is in the embodiment according to FIG. 3 constituted by a cylindrical element 12b of ceramic material. The outer end portion of the cylindrical element 12b consisting of ceramic material is forced and fixed into an element 13 consisting of metal.

The optical fibre 2a is fixed in the fibre retainer 6b and the correct position of the end surface of the optical fibre 2b can be provided according to the same principles as described with reference to FIGS. 1 and 2. Thus, the end surface 10b of the fibre retainer 6b will take an exactly predetermined position in relation to the end surface of the fibre 2b. Thereby, the end surface of the fibre 2b is in a predetermined way related to the cylindrical reference surface 8b as well as to the flat end surface 10b of the retainer.

Also the device for optical connection of the optical fibre 2b with the spherical lens 4b shown in FIG. 3 comprises in addition to the fibre retainer 6b a connector element 14b. The connector element 14b is provided with surfaces for defining the relative position between the fibre retainer 6b and therewith the optical fibre 2b and the spherical lens 4b. The surfaces of the connector element 14b for defining the relative position between the fibre retainer 6b and thereby the optical fibre 2b and the spherical lens 4b are constituted by a cylindrical surface 30b forming an opening for receiving the retainer 6b and a bottom surface 32b perpendicular to the cylindrical surface 30b and forming a bottom in the opening formed by the cylindrical surface 30b for receiving the retainer 6b and a circular edge surface 18b formed with a radius. Thus, the retainer 6b and thereby the optical fibre 2b are defined with regard to their positions in the connector element by the fact the cylindrical surface 8b of the retainer 6b engages the cylindrical surface 30b of the connector element 14b and by the fact that the end surface 10b of the retainer 6b engages the bottom surface 32b of the connector element 14b, and the position of the spherical lens 4b is defined in the connector element 14b by the engagement with the edge surface 18b.

Figure 8:
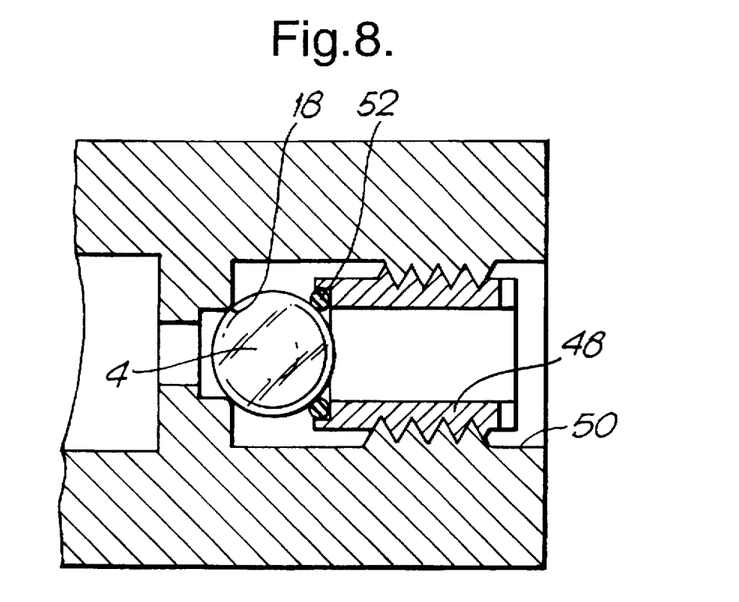
FIGS. 8 and 9 are sections of two different embodiments of devices for fixing a spherical lens in connector devices according to the invention.
Figure 9:
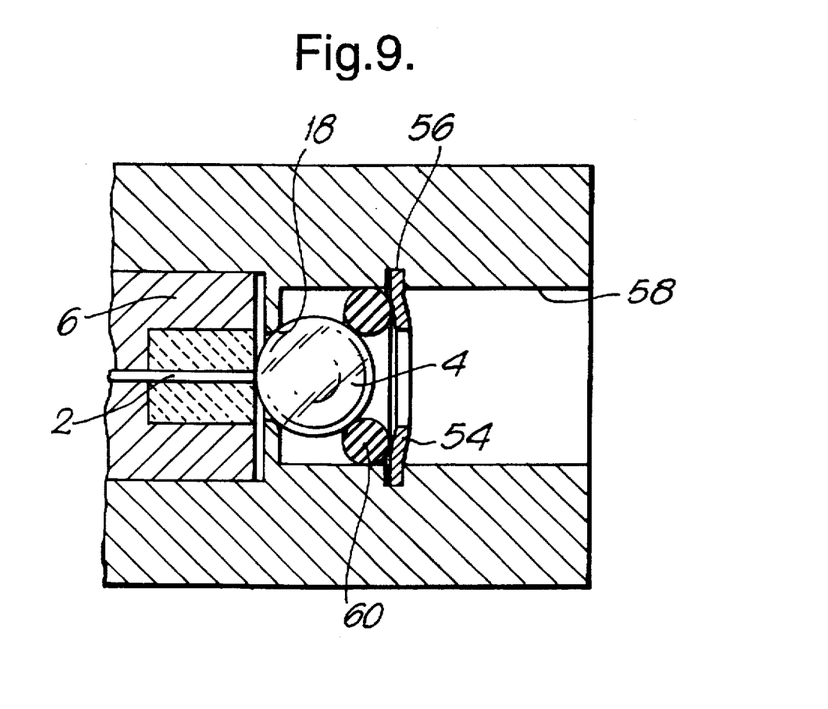
Figure 10:
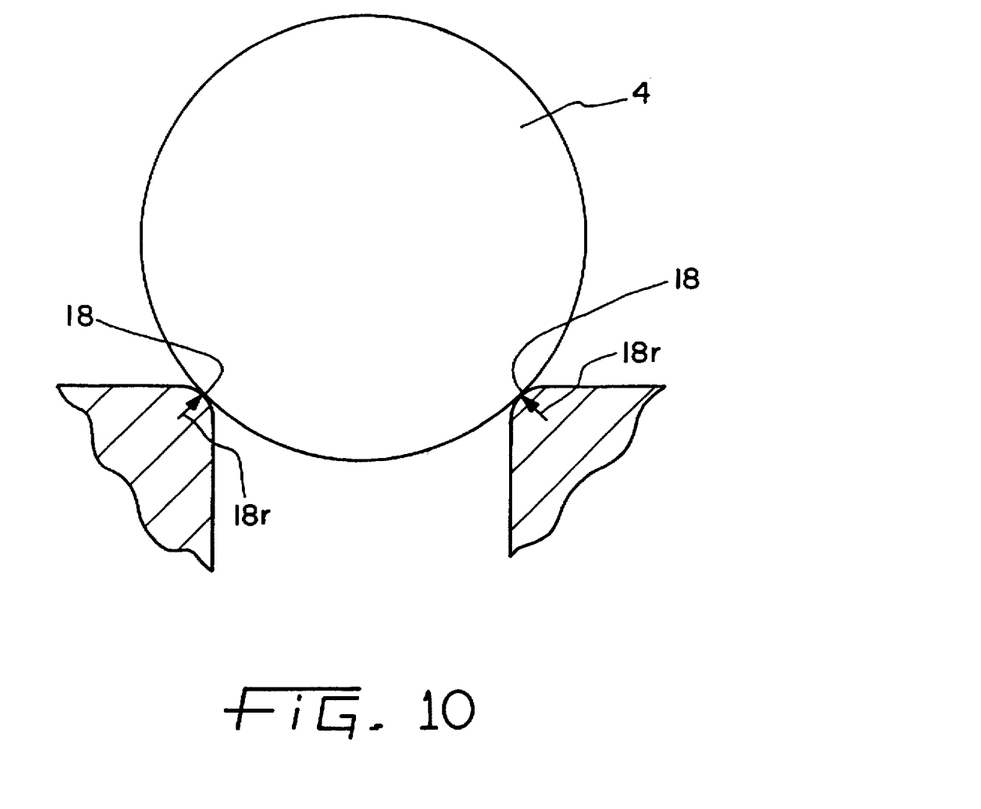
FIG. 10 is an enlarged sectional view of a spherical lens seated against a circular edge surface formed with a radius.

As in the embodiment according to FIGS. 1 and 2 the fibre retainer 6b can be maintained in engagement with the surfaces 30b and 32b by means of a conventional sleeve nut, and the spherical lens 4b can be maintained in engagement with the edge surface 18b by means of devices of the kind shown in FIGS. 8 and 9.

In a plane outside the spherical lens 4b the connector element 14b has a contact surface 24b of the same design and function as the contact surfaces 24 and 24a in the embodiments according to FIG. 1 and 2, respectively.

Figure 4:
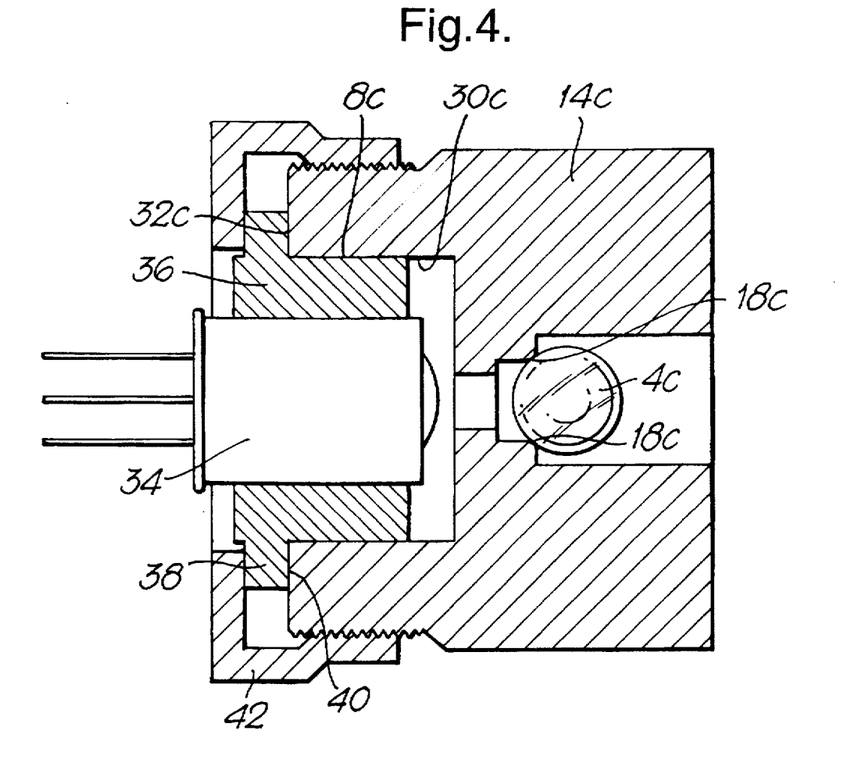

The embodiment of the device according to the invention shown in FIG. 4 is intended for connecting a diode 34 with a spherical lens 4c. Like the devices according to FIGS. 1 and 2 the device comprises a connector element 14c having a circular edge surface 18c formed with a radius, a cylindrical reference surface 30c and an annular reference surface 32c extending perpendicular thereto. In addition to the connector element 14c the device according to the embodiment of FIG. 4 comprises a retainer for the diode 34 in the form of a sleeve 36. The sleeve 36 has a cylindrical, outer reference surface 8c adapted to engage the cylindrical surface 30c of the connector element in order to define the position of the diode so that the optical axis thereof coincides with the axis of the cylindrical surface 30c. As the axis of the cylindrical surface 30c coincides with the axis of the circular edge surface 18c formed with a radius, the focus of the lens 4c will be positioned on the optical axis of the diode. In order to define the axial distance of the diode 34 from the spherical lens 4c the sleeve 36 is provided with an outer, annular flange 38 engaging the reference surface 32c of the connector element by means of a side surface 40. In the embodiment shown in FIG. 4 there is used a sleeve nut 42 for fixing the sleeve 36 and thereby the diode 34 in the position in which the surface 40 of the flange 38 engages the surface 32c. Also in this embodiment the reference surfaces provide for a correct relative position between the diode 34 and the spherical lens 4c, so that the diode and the lens are positioned on the same optical axis and at a correct axial distance from each other. The sleeve 36 can be fixedly connected with the diode 34 and can be adapted to obtain its final shape after having been connected with the diode, for example by the fact the cylindrical reference surface 8b and the annular reference surface 40 of the flange are by turning provided with their final shape after the sleeve has been connected with the diode.

Figure 5:
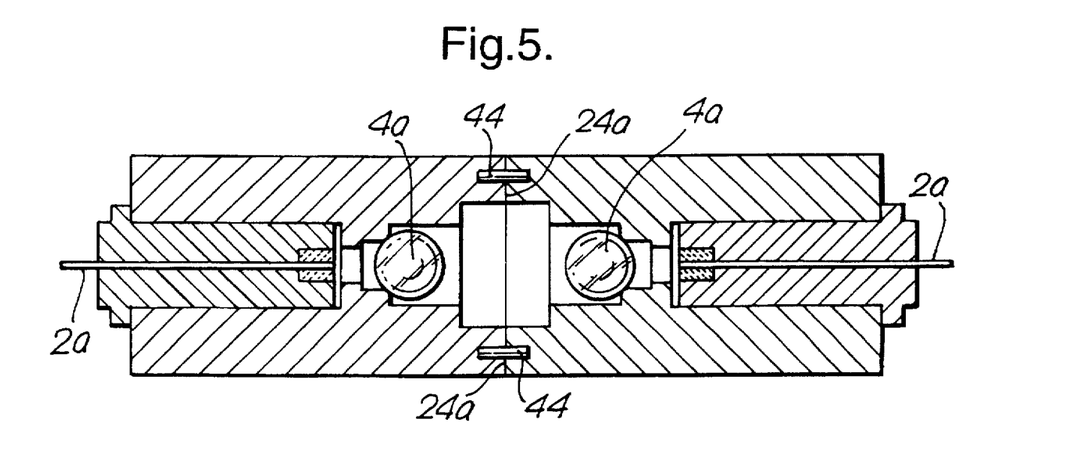
FIGS. 5, 6, and 7 are schematic sections of two devices according to the invention, connected with each other for connecting two optical elements with each other through two spherical lenses.

FIG. 5 schematically illustrates the connection of two optical fibres 2a with each other by means of devices according to the invention. Thus, the devices are constituted by two devices of the kind shown in FIG. 2 which are connected with each other with the contact surfaces 24a in engagement with each other and the devices centered in relation to each other by means of guiding pins 44. The light beam from one of the optical fibres is magnified by the spherical lens optically connected with the fibre and departs from the lens as a parallel beam having a section which is several times larger than the beam received from the optical fibre, the beam from the lens being received by the other spherical lens which reduces the beam to the optical fibre connected with the second lens. Because of the magnification of the beam in the transition area between the optical fibres the losses in the transition area are reduced.

Figure 6:
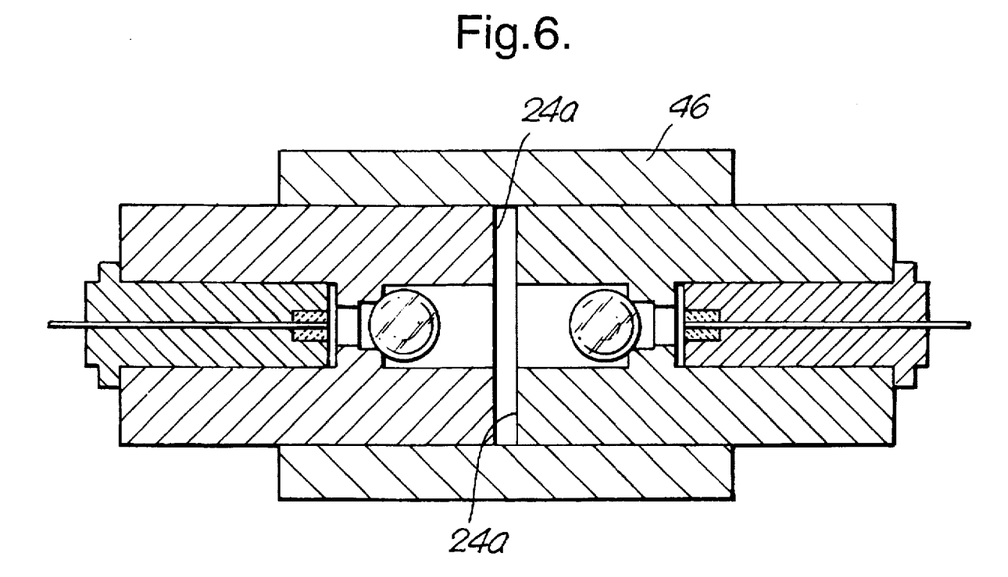

In FIG. 6 there is shown the connection of two devices of the kind shown in FIG. 2, wherein the devices are centered in relation to each other by means of an outer socket 46 instead of by means of guiding pins. The socket 46 makes it possible to provide a correct position of the devices without an engagement between the end surfaces 24a of the devices which thereby must not be designed with special precision. The axial distance between the devices can be determined in any conventional way not shown in the figure.

Figure 7:
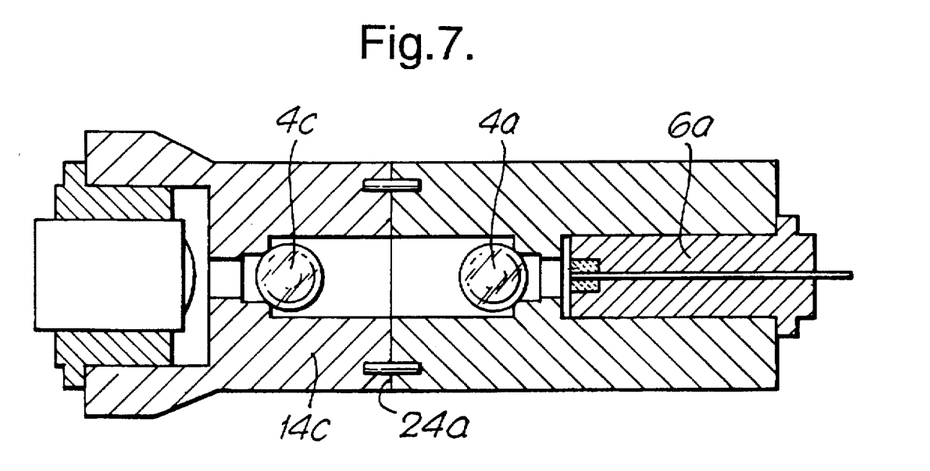

In FIG. 7 there is shown the connection between a device of the kind shown in FIG. 2 and a device of the kind shown in FIG. 4.

In FIGS. 8 and 9 there are illustrated suitable devices for retaining the spherical lens 4 in engagement with the circular edge surface 18 formed with a radius.

In the embodiment according to FIG. 8 the spherical lens 4 is retained in engagement with the circular edge surface 18 formed with a radius by means of a plug 48 having an outer thread and being threaded into a hole 50. The plug 48 has at its end which is adapted to engage the spherical lens 4 a ring 52 consisting of elastic material and resiliently forcing the spherical lens 4 against the edge surface 18.

In the embodiment according to FIG. 9 the spherical lens 4 is retained in engagement with the edge surface 18 by means of a spring ring 54 which is mounted in a groove 56 in a hole 58 connecting with the circular edge surface 18 formed with a radius. Between the spring ring 54 and the spherical lens 4 there is provided a ring 60 of elastic material resiliently forcing the spherical lens 4 against the edge surface 18.

The embodiment according to FIG. 9 illustrates that the relative position between the spherical lens 4 and the retainer 6 with the optical fibre 2 fixed therein can be determined also by a direct engagement between the spherical lens 4 and the end surfaces of the retainer and the fibre. In this case the spherical lens has such a refractive index that the focus is positioned in the surface of the lens.

The invention can be modified within the scope of the following claims and can be adapted to different combinations of connections between optical fibres and other optical elements.

What is claimed is:

1. A device for optical connection of an optical element with a spherical lens, the device comprising:
    a connector element having a first surface for defining the position of the spherical lens and a second surface for defining the position of the optical element in relation to the spherical lens thereby relatively positioning the optical element and the spherical lens, wherein the first surface of the connector element for defining the position of the spherical lens comprises a circular edge surface, the circular edge surface defining a circular opening and having a cross sectional profile which defines an arc whereby the circular edge surface forms a convex rounded edge.

2. A device as claimed in claim 1 wherein the arc defined by the cross sectional profile of the circular edge surface is formed with a radius of about 0.25 mm.

3. A device as claimed in claim 2 further comprising a fixing element for fixing the spherical lens in a position in which the spherical lens contacts the circular edge surface of the connector element.

4. A device as claimed in claim 2 wherein the device further comprises a retainer for fixing the optical element in a predetermined position in relation to a reference surface of the retainer and that the second surface of the connector element for defining the position of the optical element in relation to the spherical lens engages the reference surface of the retainer.

5. A device as claimed in claim 1 further comprising a fixing element for fixing the spherical lens in a position in which the spherical lens contacts the circular edge surface of the connector element.

6. A device as claimed in claim 5 wherein the fixing element comprises a locking element comprising a rigid material the locking element engaging the connector element and an elastic material element positioned between the locking element and the spherical lens.

7. A device as claimed in claim 6, wherein the device further comprises a retainer for fixing the optical element in a predetermined position in relation to a reference surface of the retainer and that the surface of the connector element for defining the position of the optical element in relation to the spherical lens engages the reference surface of the retainer.

8. A device as claimed in claim 5, wherein the device further comprises a retainer for fixing the optical element in a predetermined position in relation to a reference surface of the retainer and that the second surface of the connector element for defining the position of the optical element in relation to the spherical lens engages the reference surface of the retainer.

9. A device as claimed in claim 1 wherein the device further comprises a retainer for fixing the optical element in a predetermined position in relation to a reference surface of the retainer and that the second surface of the connector element for defining the position of the optical element in relation to the spherical lens engages the reference surface of the retainer.

10. A device as claimed in claim 9 wherein the optical element comprises an optical fibre, and the retainer further comprises a sleeve having a flat end surface connected with the reference surface of the retainer and coinciding with an end surface of the optical fibre.

11. A device as claimed in claim 10, wherein the connector element further comprises support surfaces which are positioned at a distance from the second surface engaging the reference surface of the retainer and are adapted to engage the retainer for maintaining the correct position thereof.

12. A device as claimed in claim 9 wherein the reference surface of the retainer and the second surface of the connector element engaging the reference surface of the retainer comprise cooperating cylindrical surfaces and contact surfaces extending transversely of respective axes of the cylindrical surfaces.

13. A device as claimed in claim 12 wherein the surfaces extending transversely of the axes of the cylindrical surfaces comprise an end surface of the connector element and an opposite surface on a flange projecting from the cylindrical surface of the retainer.

14. A device as claimed in claim 12, wherein the surfaces extending transversely of the axes of the cylindrical surfaces comprise an end surface of the retainer coinciding with an end surface of the optical fibre and an opposite surface on the connector element.

15. A device for optical connection of an optical element with a spherical lens, the device comprising:
    a connector element having a first surface for defining the position of the spherical lens and a second surface for defining the position of the optical element in relation to the spherical lens thereby relatively positioning the optical element and the spherical lens, wherein the first surface of the connector element for defining the position of the spherical lens comprises a circular edge surface, the circular edge surface defining a circular opening and having a cross sectional profile which defines an arc whereby the circular edge surface forms a rounded edge; and a retainer for fixing the optical element in a predetermined position in relation to a reference surface of the retainer and wherein the second surface of the connector element engages the reference surface of the retainer and comprises a conical surface tapering in the direction of the spherical lens.

16. A device for optical connection of an optical element with a spherical lens, the device comprising:

a connector element having a first surface for defining the position of the spherical lens and a second surface for defining the position of the optical element in relation to the spherical lens thereby relatively positioning the optical element and the spherical lens, wherein the first surface of the connector element for defining the position of the spherical lens comprises a circular edge surface, the circular edge surface defining a circular opening and having a cross sectional profile which defines an arc whereby the circular edge surface forms a rounded edge; and a retainer for fixing the optical element in a predetermined position in relation to a reference surface of the retainer and wherein the second surface of the connector element engages the reference surface of the retainer; the reference surface and the second surface comprising cooperating cylindrical surfaces and contact surfaces extending transversely of respective axes of the cylindrical surfaces, wherein the surfaces extending transversely of the axes of the cylindrical surfaces comprise contact surfaces for a direct engagement between the spherical lens and end surfaces of the retainer and the optical element.

17. A device for optical connection of an optical element with a spherical lens, the device comprising:

a connector element having a first surface for defining the position of the spherical lens and a second surface for defining the position of the optical element in relation to the spherical lens thereby relatively positioning the optical element and the spherical lens, wherein the first surface of the connector element for defining the position of the spherical lens comprises a circular edge surface, the circular edge surface defining a circular opening and having a cross sectional profile which defines an arc whereby the circular edge surface forms a rounded edge; and wherein the connector element is adapted to cooperate with guiding means, the guiding means being adapted to cooperate with another connector element comprising an optical element connected with a lens for optical connection of the optical elements of the connector elements to each other through the lenses of the connector elements.

18. A device as claimed in claim 17 wherein each connector element has a contact surface extending perpendicular to the axis of the connector elements the contact surfaces being adapted for mutual engagement.

19. A device as claimed in claim 17, wherein the guiding means comprises a sleeve enclosing adjacent portions of the connector elements.

20. A device as claimed in claim 17, wherein the guiding means comprises guiding pins.

* * * * *